United States Patent
Nakatsukasa

(10) Patent No.: US 12,186,840 B2
(45) Date of Patent: Jan. 7, 2025

(54) PULSE ARC WELDING PROFILE CONTROL METHOD, CONTROL DEVICE, WELDING SYSTEM, WELDING PROGRAM, AND WELDING POWER SUPPLY

(71) Applicant: Kabushiki Kaisha Kobe Seiko Sho (Kobe Steel, Ltd.), Kobe (JP)

(72) Inventor: Shogo Nakatsukasa, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 799 days.

(21) Appl. No.: 17/424,515

(22) PCT Filed: Dec. 23, 2019

(86) PCT No.: PCT/JP2019/050375
§ 371 (c)(1),
(2) Date: Jul. 21, 2021

(87) PCT Pub. No.: WO2020/153078
PCT Pub. Date: Jul. 30, 2020

(65) Prior Publication Data
US 2022/0088695 A1 Mar. 24, 2022

(30) Foreign Application Priority Data
Jan. 22, 2019 (JP) .................. 2019-008490

(51) Int. Cl.
*B23K 9/09* (2006.01)
*B23K 9/02* (2006.01)
(Continued)

(52) U.S. Cl.
CPC .............. *B23K 9/09* (2013.01); *B23K 9/0216* (2013.01); *B23K 9/0953* (2013.01);
(Continued)

(58) Field of Classification Search
CPC .... B23K 9/127; B23K 9/1062; B23K 9/1012; B23K 9/0956; B23K 9/0953; B23K 9/0216; B23K 9/09
See application file for complete search history.

(56) References Cited

U.S. PATENT DOCUMENTS

2005/0103766 A1* 5/2005 Iizuka .................. B23K 9/0216
219/124.34
2020/0009673 A1 1/2020 Fujii et al.
2020/0198041 A1* 6/2020 Nishida ................ B23K 9/0956

FOREIGN PATENT DOCUMENTS

JP          2004-82152 A      3/2004
JP          2009-183976 A     8/2009
(Continued)

OTHER PUBLICATIONS

Machine Translation of Ikeda, JP2009-183976A, performed May 22, 2024 (Year: 2009).*

(Continued)

*Primary Examiner* — Brian W Jennison
(74) *Attorney, Agent, or Firm* — Oblon, McClelland, Maier & Neustadt, L.L.P.

(57) ABSTRACT

A pulse arc welding profile control method, a control device, a welding system, a welding program, and a welding power supply are provided in which, even when a pulse arc welding method is used, protruding change information is extractable at high accuracy without influence from a welding current or an arc voltage having a pulse shape. An electric change amount detected at the time of weaving includes, as a parameter, at least one among a welding current detection signal and an arc voltage detection signal, takes a predetermined period as one period, calculates an average value of the electric change amount in each one period, and extracts, (Continued)

on the basis of the average value, the protruding change information in a groove to follow a welding line.

10 Claims, 8 Drawing Sheets

(51) Int. Cl.
  *B23K 9/095* (2006.01)
  *B23K 9/10* (2006.01)
  *B23K 9/127* (2006.01)
(52) U.S. Cl.
  CPC .......... *B23K 9/0956* (2013.01); *B23K 9/1012* (2013.01); *B23K 9/1062* (2013.01); *B23K 9/127* (2013.01)

(56) References Cited

FOREIGN PATENT DOCUMENTS

| | | |
|---|---|---|
| JP | 2017-185513 A | 10/2017 |
| JP | 2018-149567 A | 9/2018 |

OTHER PUBLICATIONS

International Search Report mailed on Mar. 17, 2020 in PCT/JP2019/050375 filed on Dec. 23, 2019 (3 pages).
Extended European Search Report issued Nov. 4, 2022 in European Patent Application No. 19911887.8, 7 pages.

* cited by examiner

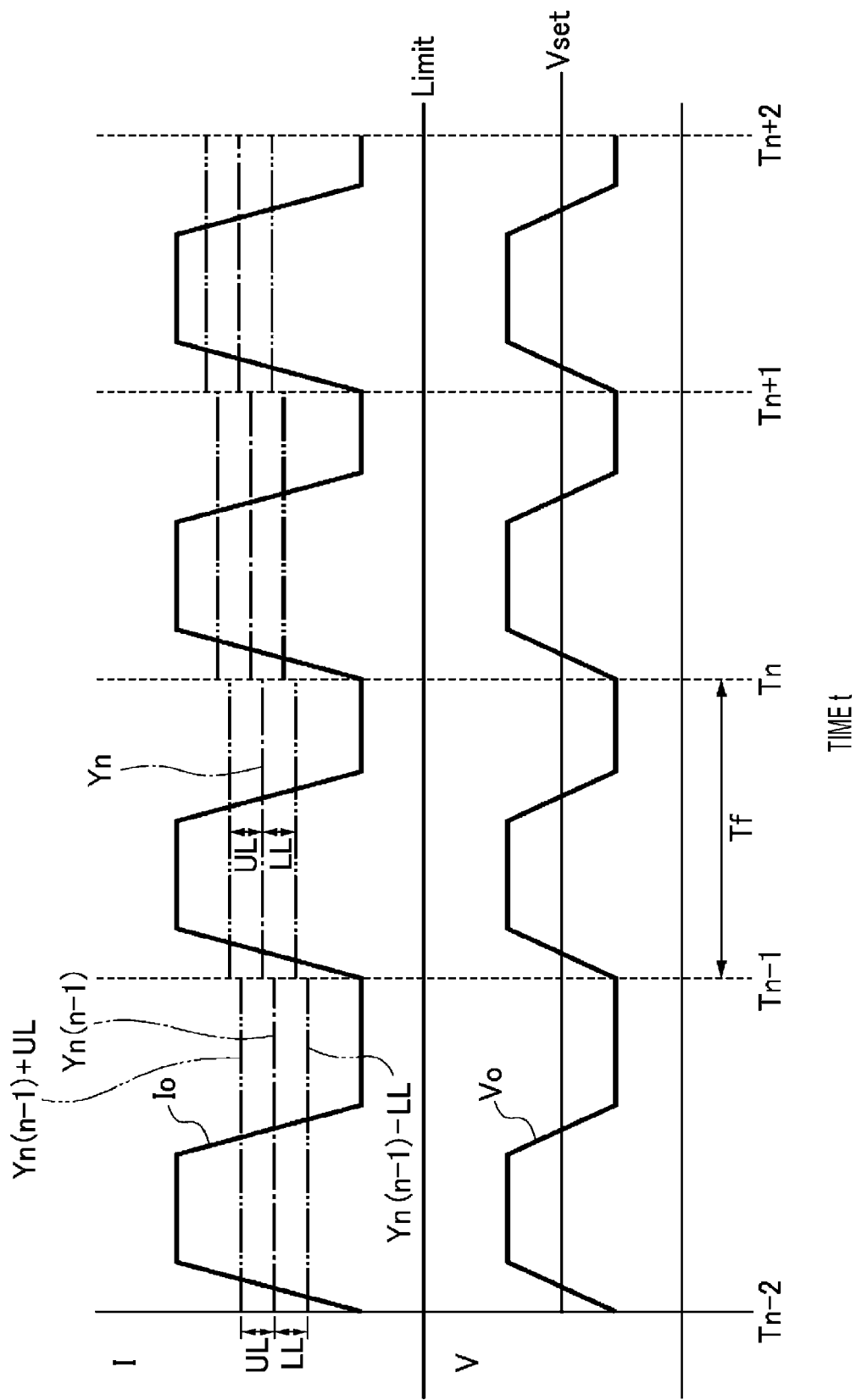

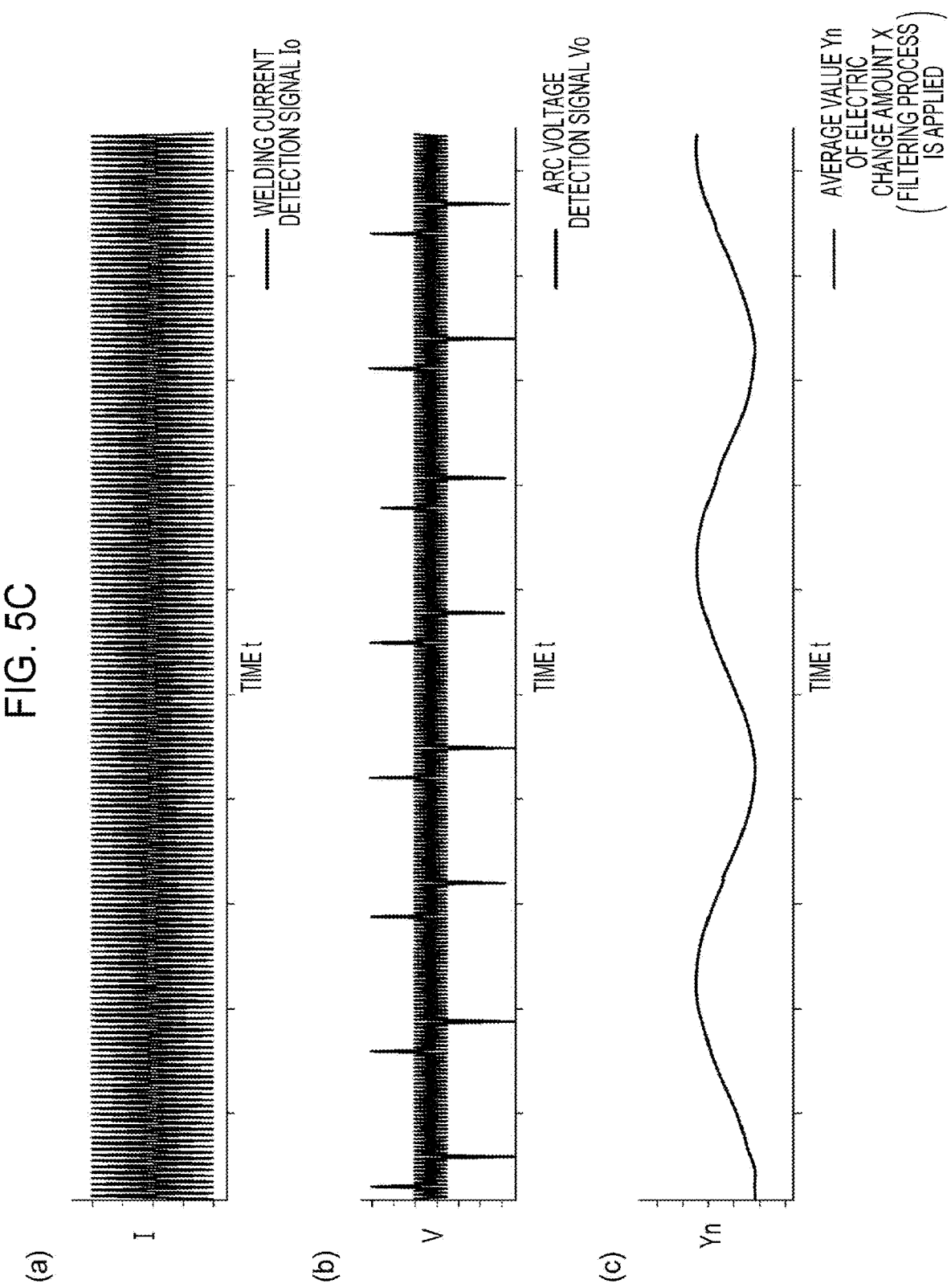

PULSE ARC WELDING PROFILE CONTROL METHOD, CONTROL DEVICE, WELDING SYSTEM, WELDING PROGRAM, AND WELDING POWER SUPPLY

TECHNICAL FIELD

The present invention relates to a pulse arc welding profile control method, a control device, a welding system, a welding program and a welding power supply. More particularly, the present invention relates to a pulse arc welding profile control method, a control device, a welding system, a welding program and a welding power supply which enable highly accurate welding line profile control even for pulse arc welding in pulse arc welding line profile control.

BACKGROUND ART

Conventionally, an arc sensor which is a non-contact sensor is used as a welding line profile control method. The arc sensor utilizes the characteristic that when the distance (hereinafter also referred to as the "distance between tip and base material" or "protruding") between a current-carrying point (a contact point between a welding wire and a contact tip) of a welding wire and a base material changes, a welding current and an arc voltage change accordingly.

Specific application examples of an arc sensor include a control method in which weaving is performed on a welding torch in a groove, change in the distance between a tip and a base material in a groove width direction is read from the change in detected welding current and arc voltage, and when the change is symmetric in the action of weaving on the left side and the right side, the torch is determined to aim for the groove center, that is, a welding line, and when the change is asymmetric in the action of weaving on the left side and the right side, the torch is determined to deviate from the welding line, and subsequently, the weaving center is moved to achieve symmetry.

Like this, the arc sensor is a method in which a welding current and an arc voltage are monitored, and the torch position is determined from an electric change amount. When the welding current and the arc voltage have a pulse-shaped waveform, in other words, when the profile control is applied to a pulse arc welding method, due to periodic change caused by the pulse, in addition to the change in the welding current and the arc voltage caused by the distance between the tip and the base material, electric change information corresponding to protruding change cannot be extracted with high accuracy, thus the profile accuracy of the welding line may be reduced, as compared with when the pulse arc welding method is not used.

In PTL 1, as a profile control method when the pulse arc welding method is used, a peak voltage limiting value Vpf is calculated by limiting a peak voltage Vp to a peak voltage variation range Vpc±ΔVpc with a central value of a predetermined peak voltage reference value Vpc, a base voltage limiting value Vbf is calculated by limiting a base voltage Vb to a base voltage variation range Vbc±ΔVbc with a central value of a predetermined base voltage reference value Vbc, and pulse arc welding is performed by moving the welding torch along the welding line based on the peak voltage limiting value Vpf and/or the base voltage limiting value Vbf every oscillation half cycle. Thus, a technique has been disclosed, which can accurately calculate a positional displacement value based on the arc voltage limiting value, the peak voltage limiting value or the base voltage limiting value with an abnormal voltage removed, and achieves highly precise profile control, the abnormal voltage being superimposed on the arc voltage due to various factors.

CITATION LIST

Patent Literature

PTL 1: Japanese Unexamined Patent Application Publication No. 2004-82152

SUMMARY OF INVENTION

Technical Problem

However, with the pulse arc welding profile control method described in PTL 1, an abnormal voltage, which occurs in the pulse waveform of the arc voltage, is only removed, and influence of the pulse waveform on the action of the welding current and the arc voltage, related to the torch position is not considered at all. In other words, the value at a peak position or a base position in the pulse waveform may be attained depending on the sampling period (or the transmission period to the robot controller) to detect a welding current or an arc voltage, thus the action of the welding current and the arc voltage related to torch protruding change information may not be extracted with high accuracy, and there is room for improvement.

The present invention has been made in view of the above-described problem, and it is an object of the invention to provide a pulse arc welding profile control method, a control device, a welding system, a welding program and a welding power supply in which, even when a pulse arc welding method is used, information on protruding change is extractable with high accuracy without influence from a welding current or an arc voltage having a pulse shape.

Solution to Problem

The above-mentioned object of the present invention is achieved by the configuration of the below-described (1) according to the pulse arc welding profile control method.

(1) A pulse arc welding profile control method that, in pulse arc welding to perform welding by periodically changing a welding current and an arc voltage, causes a welding torch to perform weaving in a groove, and follows a welding line according to an electric change amount X detected at a time of the weaving, wherein the electric change amount X includes, as a parameter, at least one of a welding current detection signal Io and an arc voltage detection signal Vo, an average value Yn of the electric change amount X is calculated for every one interval, the one interval being a predetermined period Tf, and information on protruding change in the groove is extracted and the welding line is followed based on the average value Yn.

A preferred embodiment of the present, invention according to the pulse arc welding profile control method relates to (2) to (7) described below.

(2) The pulse arc welding profile control method according to (1) described above, wherein the predetermined period Tf is one cycle of pulse or multiple cycles of pulse of the electric change amount X.

(3) The pulse arc welding profile control method according to (1) or (2) described above, wherein the electric change amount X includes, as a parameter, a ratio (Vo/Io) of the arc voltage detection signal Vo to the welding current detection signal Io, or a ratio (Io/Vo) of the welding current detection signal Io to the arc voltage detection signal Vo.

(4) The pulse arc welding profile control method according to (3) described above, wherein the average value Yn is a value obtained by multiplying an average value of the electric change amount X in the predetermined period Tf by a predetermined set voltage Vset when the electric change amount X is the ratio (Io/Vo) of the welding current detection signal Io to the arc voltage detection signal Vo.

(5) The pulse arc welding profile control method according to any one of (1) to (4) described above, wherein the average value Yn is calculated using the electric change amount X which is filtered with a frequency filter.

(6) The pulse arc welding profile control method according to (5) described above, wherein the frequency filter is a low pass filter having a cutoff frequency selected from a range of 10 to 120 Hz.

(7) The pulse arc welding profile control method according to any one of (1) to (6) described above, wherein an upper limit limiting value is calculated by adding a predetermined upper limit range value to a central value, and a lower limit limiting value is calculated by adding a predetermined lower limit range value to the central value which is the average value Yn of the electric change amount X in an immediately preceding interval of a target measurement period, and when the average value Yn in the target measurement period exceeds the upper limit limiting value or falls below the lower limit limiting value, a predetermined process is performed.

The above-mentioned object of the present invention is achieved by the configuration of the below-described (8) according to the control device.

(8) A control device that, in pulse arc welding to perform welding by periodically changing a welding current and an arc voltage, causes a welding torch to perform weaving in a groove, and follows a welding line according to an electric change amount X detected at a time of the weaving, wherein the electric change amount. X includes, as a parameter, at, least one of a welding current detection signal Io and an arc voltage detection signal Vo, and an average value Yn of the electric change amount X is calculated for every one interval, the one interval being a predetermined period Tf.

A preferred embodiment of the present invention according to the control device relates to (9) described below.

(9) The control device according to (8) described above, wherein control is performed so that the information on protruding change in the groove is extracted and the welding line is followed based on the average value Yn.

The above-mentioned object of the present invention is achieved by the configuration of the below-described (10) according to the welding system.

(10) A welding system comprising a control function that, in pulse arc welding to perform welding by periodically changing a welding current and an arc voltage, causes a welding torch to perform weaving in a groove, and follows a welding line according to an electric change amount X detected at a time of the weaving, wherein in the control function, the electric change amount X includes, as a parameter, at least one of a welding current detection signal Io and an arc voltage detection signal Vo, an average value Yn of the electric change amount X is calculated for every one interval, the one interval being a predetermined period Tf, and the information on protruding change in the groove is extracted and the welding line is followed based on the average value Yn.

The above-mentioned object of the present invention is achieved by the configuration of the below-described (11) according to the welding program.

(11) A welding program that, in pulse arc welding to perform welding by periodically changing a welding current and an arc voltage, causes a welding torch to perform weaving in a groove, and follows a welding line to perform welding according to an electric change amount X detected at a time of the weaving, the welding program comprising:

a step of weaving a welding torch in a groove;

a step of detecting the electric change amount X at a time of the weaving;

a step of calculating an average value Yn of the electric change amount X for every one interval, the one interval being a predetermined period Tf;

a step of extracting information on protruding change in the groove based on the average value Yn; and a step of following the welding line based on the information on protruding change.

The above-mentioned object of the present invention is achieved by the configuration of the below-described (12) according to the welding power supply.

(12) A welding power supply including a function that, in pulse arc welding to perform welding by periodically changing a welding current and an arc voltage, causes a welding torch to perform weaving in a groove, and follows a welding line according to an electric change amount X detected at a time of the weaving, the welding power supply comprising:

a power supply unit that generates an arc to supply electric power for welding;

a current controller that receives a signal such as a feed speed command, a welding current command, an arc voltage command, and calculates a control amount of the power supply unit;

a current detector that detects a welding current Iw during welding, and outputs a welding current detection signal Io;

a voltage detector that detects an arc voltage Vw during welding, and outputs an arc voltage detection signal Vo; and a controller that performs control such that the electric change amount X includes, as a parameter, at least one of the welding current detection signal Io and the arc voltage detection signal Vo, an average value Yn of the electric change amount X is calculated for every one interval, the one interval being a predetermined period Tf, and information on protruding change in the groove is extracted and the welding line is followed based on the average value Yn.

Advantageous Effects of Invention

With a pulse arc welding profile control method, a control device, a welding system, a welding program, and a welding power supply of the present invention, torch protruding change information necessary for arc profile control can be extracted with high accuracy without influence from periodic change in a welding current and arc voltage due to the pulse, thus highly accurate welding line profile control can be achieved.

BRIEF DESCRIPTION OF DRAWINGS

FIG. 4 is an enlarged view of a detection signal of a welding current and an arc voltage which have been input.

FIG. 5C is a graph showing a welding current waveform and an arc voltage waveform when an abnormal voltage is generated, and information on protruding change extracted from the welding current waveform and the arc voltage waveform by a control method of a modification, to which filtering process by a frequency filter is applied, of the present invention.

DESCRIPTION OF EMBODIMENTS

Hereinafter, one embodiment of a welding system according to the present invention will be described with reference to the drawings. Note that the present embodiment is an example when a welding robot is used, and profile control of the present invention is not limited to the configuration of the present embodiment. For example, profile control of the present invention may be installed on an automated device using a wagon. Also, a pulse arc welding method is used in the present embodiment.
<System Configuration>

Figure 1:
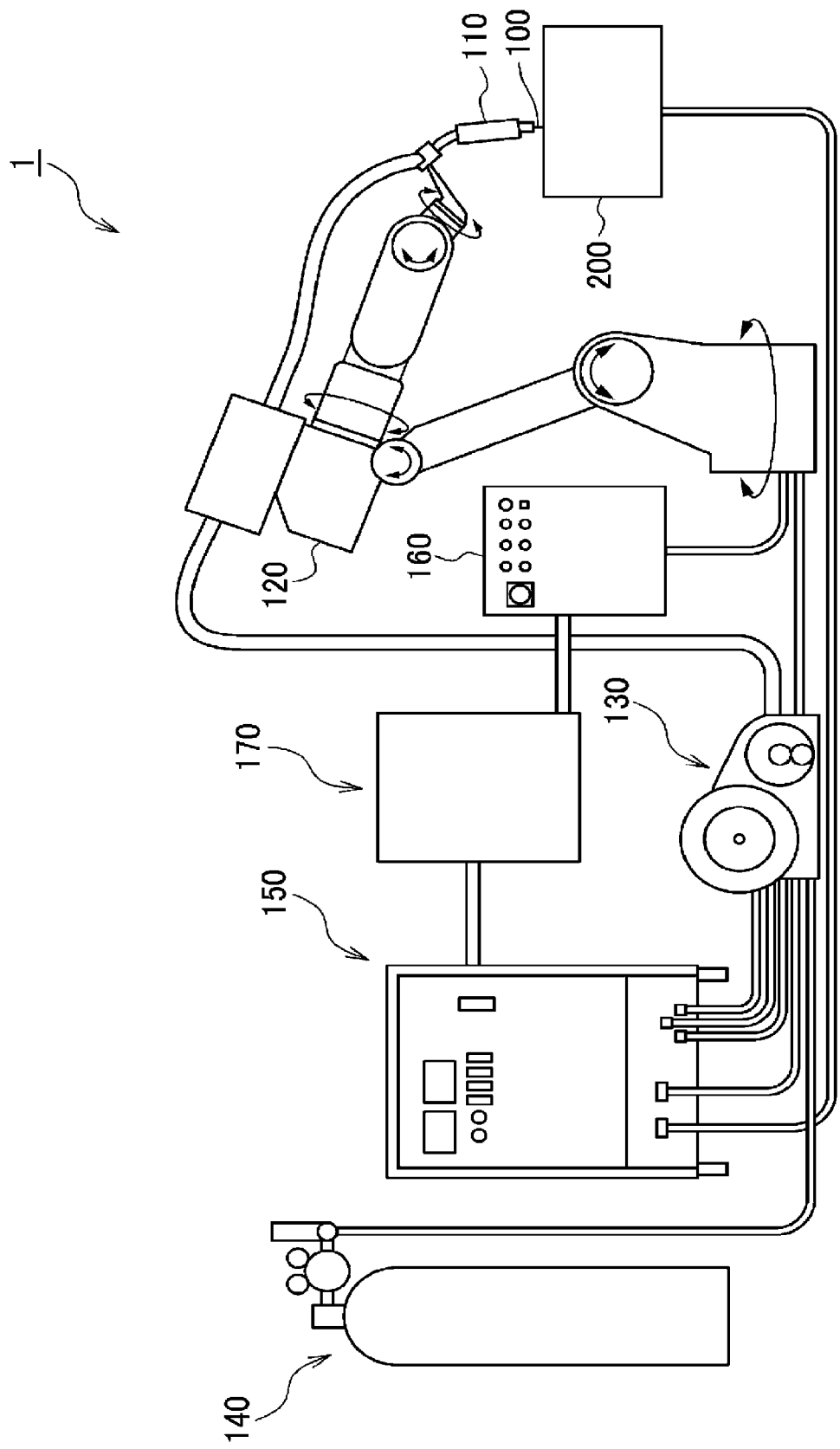
FIG. 1 is a schematic illustration of a welding system in one embodiment that can implement profile control welding according to the present invention.

FIG. 1 is a schematic illustration showing a configuration example of an arc welding system 1 according to the present embodiment. The arc welding system 1 includes a welding robot 120, a feeding device 130, a shield gas supply device 140, a welding power supply 150, a robot, controller 160, and a profile device 170. In FIG. 1, the profile device 170 is disposed between the welding power supply 150 and the robot controller 160. However, the function of the profile device 170 may be provided by the welding power supply 150 or the robot controller 160.

The welding power supply 150 is connected to a welding electrode through a positive power cable, and is connected to an object to be welded (hereinafter also referred to as a "base material" or a "work") 200 through a negative power cable. This connection is for the case where welding is performed with reverse polarity, and when welding is performed with positive polarity, the welding power supply 150 is connected to the base material 200 through a positive power cable, and connected to a welding electrode through a negative power cable. In addition, the welding power supply 150 is also connected to the feeding device 130 of a consumable electrode (hereinafter also referred to as a "welding wire") 100 by a signal line, and can control the feed speed of the welding wire 100.

The welding robot 120 includes a welding torch 110 as an end effector. The welding torch 110 has a current-carrying mechanism (contact tip) to cause the welding wire 100 to carry a current. The welding wire 100 generates an arc from its tip end by current-carrying from the contact tip, and welds the base material 200 with the heat, which is an object to be welded.

In addition, the welding torch 110 includes a shield gas nozzle (mechanism to spray a shield gas). The shield gas may be any one of a carbon dioxide gas, an argon gas, or a mixed gas of argon gas and carbon dioxide gas, for example. Note that a carbon dioxide gas is more preferably used as the shield gas, and when a mixed gas is used, a mixed gas of an argon gas and 10 to 30% carbon dioxide gas is more preferably used. The shield gas is supplied from the shield gas supply device 140.

The welding wire 100 used in the present embodiment may be either one of a solid wire not containing a flux and a flux-cored wire containing a flux. Also, the material of the welding wire 100 is not particularly limited, and for example, mild steel, stainless steel, aluminum, titanium may be used. Furthermore, the diameter of the welding wire 100 is not particularly limited. In the case of the present embodiment, preferably, the upper limit of the diameter is 1.6 mm, and the lower limit is 0.8 mm.

The robot controller 160 controls the operation of the welding robot 120. The robot controller 160 has teaching data which defines the operation patterns of the welding robot 120, welding start positions, welding end positions, welding conditions, weaving operations in advance, and give these instructions to the welding robot, 120 to control the operation of the welding robot 120. In addition, the robot, controller 160 provides the welding power supply 150 with welding conditions such as a welding current, an arc voltage, a feed speed during welding work according to the teaching data.

The welding power supply 150 supplies electric power to the welding wire 100 and the object to be welded 200 by a command from the robot controller 160, thereby generating arcs between the welding wire 100 and the object to be welded 200. In addition, the welding power supply 150 outputs a signal for controlling the feed speed of the welding wire 100 to the feeding device 130 by a command from the robot controller 160.
<Functional Configuration According to Arc Profile Control System>

Figure 2:
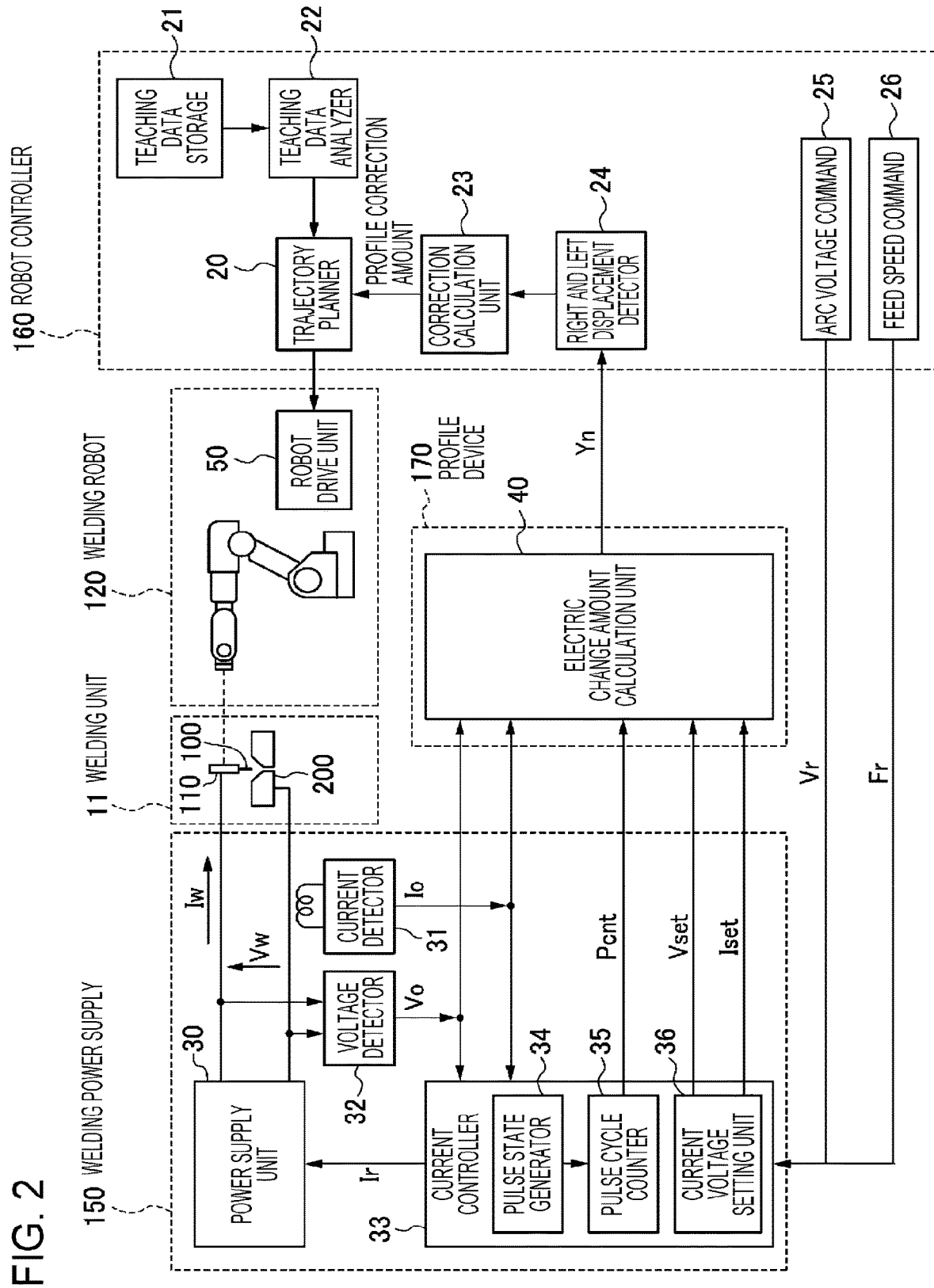
FIG. 2 is a configuration diagram according to an arc profile control system of the welding system shown in FIG. 1.

FIG. 2 is a configuration diagram according to an arc profile control system of the present embodiment. In the present embodiment, the work 200 has a groove. Note that the V groove shown in FIG. 2 is an example, and the present invention is applicable even for other groove shapes and fillet welding. A welding unit 11 is as seen in a welding proceeding direction, and the work 200 is welded by the welding robot 120 while weaving the welding torch 110 in the right and left directions in FIG. 2.
<Functional Configuration of Robot Controller>

The robot controller 160 includes a teaching data storage 21 that stores teaching data generated in advance, a teaching data analyzer 22 that analyzes the teaching data, and a trajectory planner 20 that generates servo command information for instructing a robot drive unit 50 (servo driver) that controls the axes of the welding robot 120.

The teaching data storage 21 stores teaching data that defines the operation patterns and the like of the welding robot 120. The teaching data is generated by a worker in advance with a teaching device which is not illustrated. Note that a generation method may be other than a teach pendant. For example, the teaching data may be generated on a PC, and may be stored in the teaching data storage 21 by wireless or wired communication.

For example, upon a welding start operation as a trigger, the teaching data analyzer 22 retrieves teaching data from the teaching data storage 21, and analyzes the teaching data. Teaching trajectory information and welding condition command information are generated by the analysis of the teaching data. The teaching trajectory information is information that defines the trajectory of the welding robot 120 in welding work, including a welding speed and weaving conditions. The welding condition command information is for executing a command related to a welding current, an arc voltage, a feed speed in welding work, and includes control commands for welding conditions, including a command of arc ON/OFF. The teaching data analyzer 22 then outputs the generated teaching trajectory information to the trajectory planner 20. Alternatively, the teaching data analyzer 22 may output the generated welding condition command information to the welding power supply 150. For example, an arc voltage command signal Vr and a feed speed command signal Fr are output to the welding power supply 150 by an arc voltage command 25 and a feed speed command 26, respectively.

The trajectory planner 20 calculates a target position of the welding robot 120 based on the teaching trajectory information input from the teaching data analyzer 22, and generates servo command information to control each axis of the welding robot 120. The trajectory planner 20 then outputs the generated servo command information to the robot drive unit 50 of the welding robot 120.

The welding robot 120 performs an operation based on the servo command information. The servo command information includes weaving position command information for commanding a weaving position of the welding torch 110, and the trajectory planner 20 uses the teaching trajectory information output from the teaching data analyzer 22, and the later-described right and left displacement detector 24 detects the right and left displacement amount from a welding line based on the information on protruding change output from the later-described electric change amount calculation unit 40. The later-described correction amount calculation unit 23 calculates a correction amount with respect to the center of weaving from the right and left displacement amount. The trajectory planner 20 resets the weaving position command information based on the correction amount, and outputs the servo command information to the robot drive unit 50 of the welding robot 120.

<Functional Configuration of Welding Power Supply>

The welding power supply 150 includes a power supply unit 30 that generates arcs to supply electric power to perform welding; a current controller 33 that receives a signal such as a feed speed command a welding current command or an arc voltage command, and calculates the control amount of the power supply unit 30; a current detector 31 that detects a welding current Iw during welding, and outputs a welding current detection signal Io; and a voltage detector 32 that detects an arc voltage Vw during welding, and outputs an arc voltage detection signal Vo.

The power supply unit 30 of the welding power supply 150 receives an input of a commercial power supply of 3-phase 200V or the like, performs output control on the input AC voltage by inverter control, an inverter transformer, a rectifier according to an error amplification signal output from the later-described current controller 33, and outputs the arc voltage Vw and the welding current Iw. Also, a reactor may be formed in order to smooth the output voltage.

The current controller 33 of the welding power supply 150 has a function of setting various parameters related to the welding current which flows through the welding wire 100. In the case of the present embodiment, the welding current is a pulse current, and the current controller 33 determines the parameters of pulse welding, such as a peak current, a base current based on the welding condition command information (the arc voltage command 25, the feed speed command 26) input from the robot controller 160. Note that the pulse waveform is not particularly limited, and may be any one of a sine waveform, a trapezoidal shape, and a triangular waveform.

Also, a voltage setting signal Vr is compared with the voltage detection signal Vo detected by the voltage detector 32, the difference between the voltage setting signal Vr and the voltage detection signal Vo is amplified, and the current controller 33 controls the pulse frequency based on the voltage error amplification signal so as to maintain constant length of each arc (arc length) generated between the tip end of the welding wire 100 and the work 200, and outputs a command to increase or decrease the welding current, as a current setting control signal Ir, to the power supply unit 30 to control the welding current Iw.

In other words, the current controller 33 finely adjusts a wire melting rate through the control of the welding current Iw, and performs constant voltage control to maintain a constant distance between the tip and the base material. In addition, the current controller 33 includes a pulse state generator 34 and a pulse cycle counter 35 in order to determine one pulse period. The pulse cycle counter 35 receives an input of a pulse signal from the pulse state generator 34, and starts counting at the start point of the pulse based on the state signal of start or end of the pulse, then resets the counter when shift is made to the start point of the next pulse. The pulse period counter 35 starts counting again after the reset, and outputs a count value Pcnt to the electric change amount calculation unit 40. The electric change amount calculation unit 40 determines the period of one pulse and the start or end of the pulse based on the received count value Pcnt.

The current detector 31 detects the welding current Iw during welding and outputs the welding current detection signal Io. The welding current detection signal Io is digitally converted by an A/D converter, and is input to the current controller 33 and the electric change amount calculation unit 40.

The voltage detector 32 detects an arc voltage Vw during welding, and outputs an arc voltage detection signal Vo. The arc voltage detection signal Vo is digitally converted by the A/D converter, and is input to the current controller 33 and the electric change amount calculation unit 40.

<Functional Configuration of Profile Device>

The profile device 170 is an example of a control device having a function of controlling the profile, and includes the electric change amount calculation unit 40 that retrieves information on protruding change. In the present embodiment, an electric change amount X in at least one of the welding current detection signal Io detected by the current detector 31 and the arc voltage detection signal Vo detected by the voltage detector 32 is input to the electric change amount calculation unit 40.

Figure 3A:
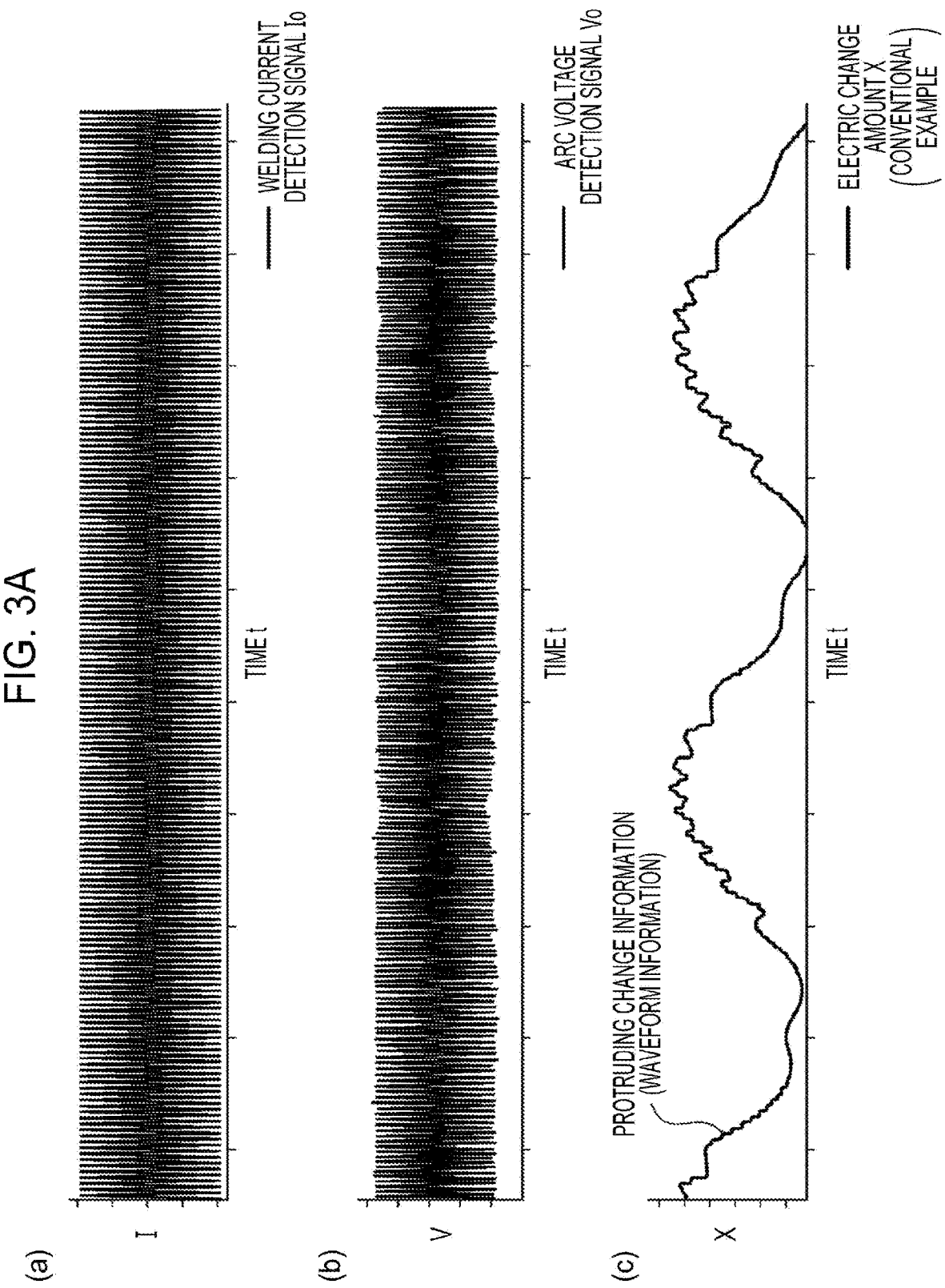
FIG. 3A is a graph showing a welding current, waveform and an arc voltage waveform of pulse arc welding, and information on protruding change extracted from the welding current waveform and the arc voltage waveform by a conventional control method.
Figure 3B:
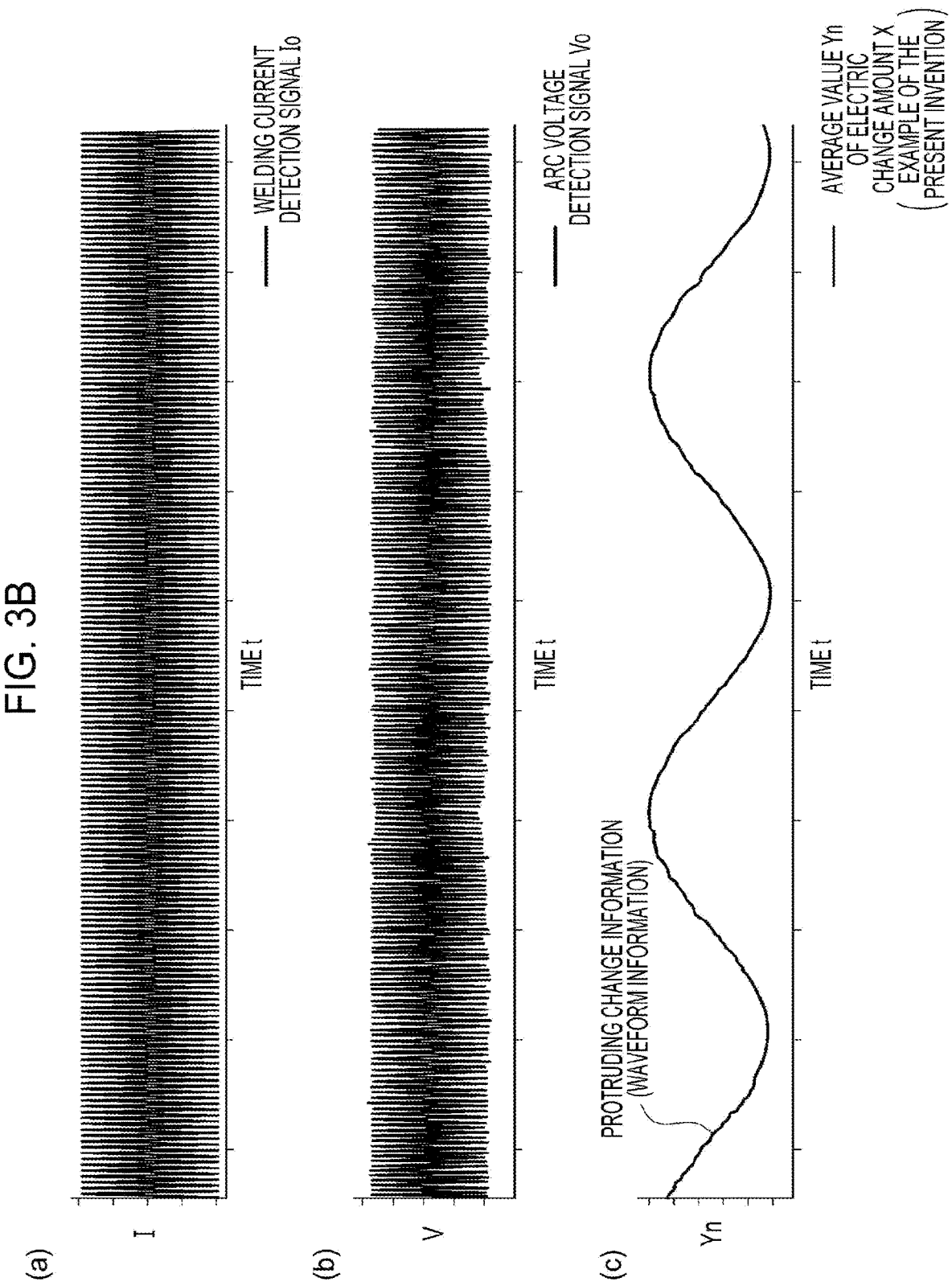
FIG. 3B is a graph showing a welding current waveform and an arc voltage waveform of pulse arc welding, and information on protruding change extracted from the welding current waveform and the arc voltage waveform by a control method according to the present invention.

In the present embodiment, as described above, the pulse arc welding method is used, thus respective detection signals Io, Vo (the electric change amount X) of the input welding current Iw, arc voltage Vw have a pulse shape as shown in FIG. 4. FIG. 4 is an enlarged view of part of the graph representing the change in the welding current detection signal Io and the arc voltage detection signal Vo for time t as shown in FIG. 3A and FIG. 3B.

The electric change amount calculation unit 40 calculates an average value Yn of the electric change amount X in one interval based on Expression (1) below, the one interval being a predetermined period Tf, for example, one cycle of pulse of the electric change amount X is (Tf=$T_n$-$T_{n-1}$ in FIG. 4). The average value Yn in the one interval is transmitted with a transmission cycle defined in the robot controller 160.

In the present embodiment, one interval is set to one period of pulse which is the most preferable as the period Tf because highly accurate information on protruding change is easily obtained with the one interval. Alternatively, multiple cycles of the pulse, or multiple cycles of the transmission cycle defined in the robot controller 160 may be one interval as the period Tf. For example, let period Tf be two cycles of the pulse, and the average value Yn is calculated in the period Tf as one interval.

Note that, for example, when one interval is set to one period of the pulse, information on the period Tf is provided to the electric change amount calculation unit 40 in terms of the above-mentioned count value Pcnt.

[Math. 1]

$$Yn = \frac{1}{(T_n - T_{n-1})} \times \int_{T_{n-1}}^{T_n} \{X\} \cdot dt \quad \text{[Expression 1]}$$

In Expression (1), X is an electric change amount, $T_n$-$T_{n-1}$ is a predetermined period (Tf), and Yn is the average value of the electric change amount X.

At least one of the welding current detection signal Io and the arc voltage detection signal Vo is input as the signal to be input to the electric change amount calculation unit 40, that is, as the electric change amount X. Preferably, it is better to input both the welding current detection signal Io and the arc voltage detection signal Vo. For Io/Vo (the reciprocal of a resistance) which is the ratio of the welding current detection signal Io to the arc voltage detection signal Vo, or Vo/Io (resistance) which is the ratio of the arc voltage detection signal Vo to the welding current detection signal Io, it is more preferable to calculate an average value in one interval Tf of the pulse, which is a predetermined period. The reason why both the welding current detection signal Io and the arc voltage detection signal Vo are input will be described in detail in <External Characteristics> stated below.

In addition to the welding current detection signal Io and the arc voltage detection signal Vo, at least one signal of a set voltage Vset and a set current Iset may be input to the electric change amount calculation unit 40. In other words, the set voltage Vset and the set current Iset are included as input values. Preferably, it is better to input the set voltage Vset. Specifically, as shown in Expression (2) below, the value obtained by multiplying the average value of the electric change amount X in a predetermined period Tf by a predetermined set voltage Vset is output as the average value Yn, where the electric change amount X uses Io/Vo (the reciprocal of a resistance) which is the ratio of the welding current detection signal Io to the arc voltage detection signal Vo. When Io/Vo is used for the electric change amount X, the unit of the average value Yn calculated by multiplying the average value of the electric change amount X by the set voltage Vset is the same as the unit of Io, thus compatibility can be established with a conventional robot controller that performs control with only the welding current detection signal Io, which is further preferable from the viewpoint of versatility.

[Math. 2]

$$Yn = Vset \times \frac{1}{(T_n - T_{n-1})} \times \int_{T_{n-1}}^{T_n} \left\{\frac{Vo}{Io}\right\} \cdot dt \quad \text{[Expression 2]}$$

Where Io is a welding current detection signal, Vo is an arc voltage detection signal, $T_n$-$T_{n-1}$ is a predetermined period Tf, Vset is a predetermined setting voltage, Yn is the average value of the electric change amount X (=Vo/Io) in Expression (2).

Here, FIG. 3A shows the welding current, detection signal Io ((a) in FIG. 3A) and the arc voltage detection signal Vo ((b) in FIG. 3A), and the information on protruding change ((c) in FIG. 3A) obtained by a conventional control method in which the welding current detection signal Io is sampled with a predetermined sample cycle (for example, 5 its). Also, FIG. 3B shows the welding current detection signal Io ((a) in FIG. 3B) and the arc voltage detection signal Vo ((b) in FIG. 3B), and the information on protruding change ((c) in FIG. 3B) calculated by Expression (1) using the control method according to the present embodiment.

As shown in FIG. 3A, with the conventional control method, signal blurring occurs in the signal (waveform information of the electric change amount X) representing the information on protruding change. In contrast, as shown in FIG. 3B, with the control method of the present embodiment, almost no signal blurring occurs in the signal (waveform information of the average value Yn of the electric change amount X) representing the information on protruding change, and it is seen that the signal is obtained with high accuracy.

The right and left displacement detector 24 of the robot controller 160 detects a difference between the right and left according to the information on protruding change input from the electric change amount calculation unit 40, and outputs the difference to the correction amount calculation unit 23. The correction amount calculation unit 23 calculates a correction amount with respect to the center of weaving, and outputs the correction amount to the trajectory planner 20 of the robot controller 160. The method of calculating a right and left displacement and a correction amount is not particularly limited, and any method may be used, such as a method of detecting a power spectral, a method (protruding length calculation method) of determining the distance between the contact tip and the base material 200 by calculation, and a pattern matching method, for example.

The method of detecting a power spectral in the present embodiment detects the power spectral of the average value Yn which is synchronized with the weaving frequency. The method is based on the fact that when the welding torch 110 is swung around a welding line at the center, the waveform of time series data (information on protruding change) of the average value Yn varies with a frequency which is twice the weaving frequency. In other words, when the welding torch 110 is swung along the welding line profile (in a normal case), the waveform of the information on protruding change has the greatest component of a frequency which is twice the weaving frequency. In contrast, when the welding torch 110 is significantly displaced to the right or the left from the welding line, the component of the weaving frequency becomes the greatest, and the component of a frequency of twice the weaving frequency cannot be substantially observed. By utilizing this characteristic, the right and left displacement amount of the torch position is determined from the ratio of the component of the weaving frequency of a power spectral and the component of a frequency of twice the weaving frequency.

The protruding length calculation method in the present embodiment determines the distance between the contact tip and the base material 200 by calculation when the welding torch 110 is swung in the groove, and identifies the position of the welding line from the torch position. The distance between the contact tip and the base material 200 is determined by calculation by a profile controller not illustrated based on the detected wire feed speed, welding current Iw, and arc voltage Vw. The position of the welding torch 110 can be extracted by drawing a Lissajous' figure with the calculated distance between the contact tip and the base material 200, and the right and left displacement amount from the welding line can be calculated by comparing with a normal case.

The pattern matching method in the present embodiment extracts a parameter indicating the pattern shape (information on protruding change) of the average value Yn, recognizes the parameters by pattern, estimated from various conditions, such as a weaving frequency, a circuit inductance, a groove condition, a welding condition, and calculates a right and left displacement amount.

Modification

As a modification of the present embodiment, it is preferable that a filtering process be applied by an unillustrated frequency filter to the average value Yn output from the electric change amount calculation unit 40, then the filtered average value Yn be input to a protruding change information extractor (the right and left displacement detector 24, the correction amount calculation unit 23). After passing through the frequency filter, a highly accurate signal can be obtained. In addition, it is more preferable that the frequency filter be a low pass filter and a cutoff frequency thereof be selected from a range of 10 to 120 Hz.

In the case where an abnormal voltage is generated, an upper limit limiting value (Yn(n−1)+UL) and a lower limit limiting value (Yn(n−1)−LL) of the average value Yn are provided according to predetermined upper limit range value UL and lower limit range value LL relative to a central value (for example, the central value ±20 A) which is the average value (Yn(n−1)) in the immediately preceding interval of a target measurement period (for example, the period of $T_n-T_{n-1}$ in FIG. 4 is assumed) which is an interval during calculation in the electric change amount calculation unit, 40. When the calculated average value Yn in the target measurement, period exceeds the upper limit, control value (Yn(n−1)+UL), or falls below the lower limit control value (Yn(n−1)−LL), it is preferable to perform control of a predetermined process.

Specific processing performed when the upper limit control value or the lower limit control value is exceeded includes, for example, replacing the average value Yn in the target measurement period with the average value (Yn(n−1)) in the immediately preceding interval, and the upper limit limiting value (Yn(n−1)+UL), or the lower limit limiting value (Yn(n−1)−LL) are used instead. Preferably, it is better to use the average value (Yn(n−1)) in the immediately preceding interval.

By performing such control, even when a prominent abnormal signal occurs in the arc voltage detection signal Vo, highly accurate information on protruding change is obtained.

Figure 5A:
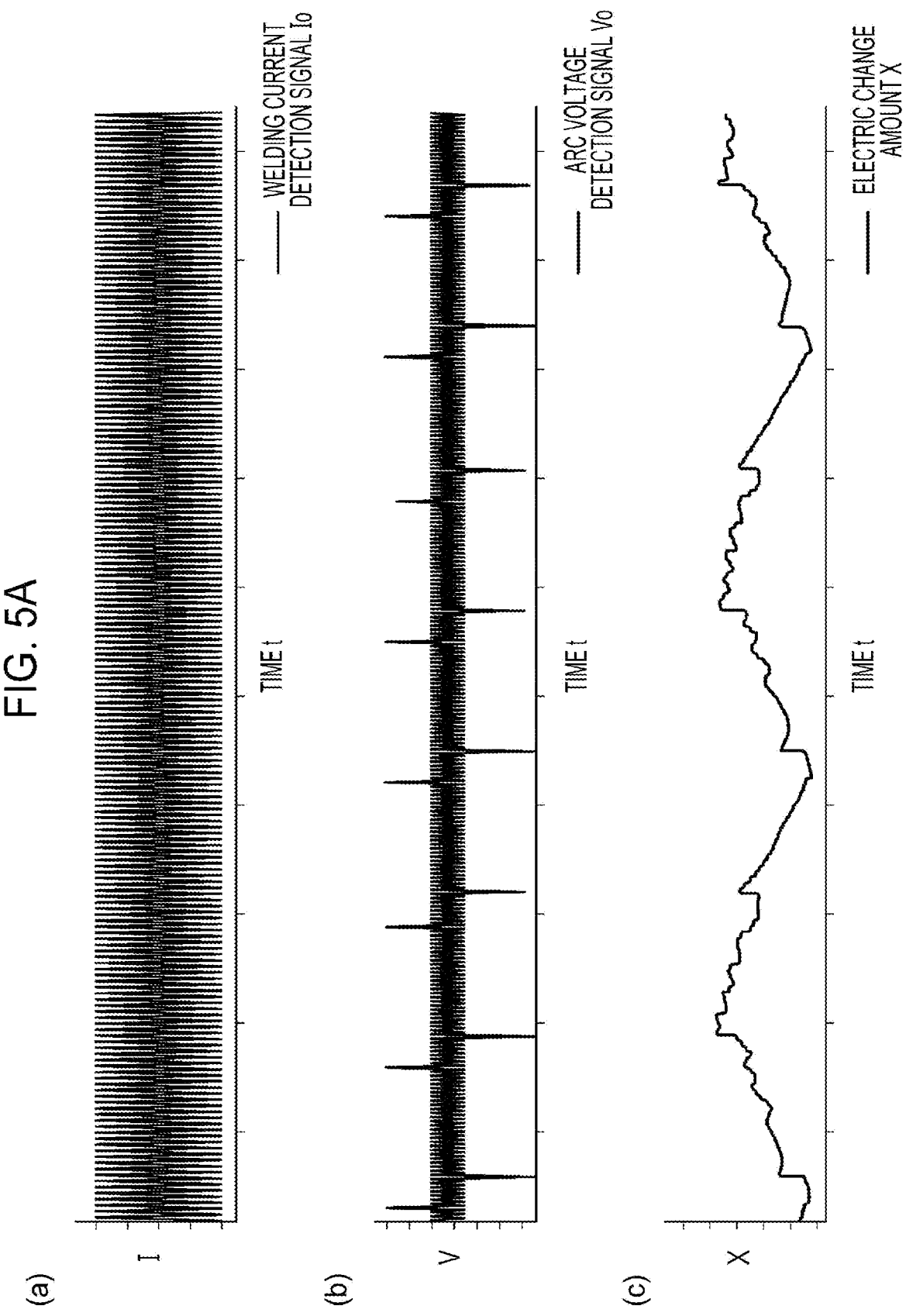
FIG. 5A is a graph showing a welding current waveform and an arc voltage waveform when an abnormal voltage is generated, and information on protruding change extracted from the welding current waveform and the arc voltage waveform by a conventional control method.
Figure 5B:
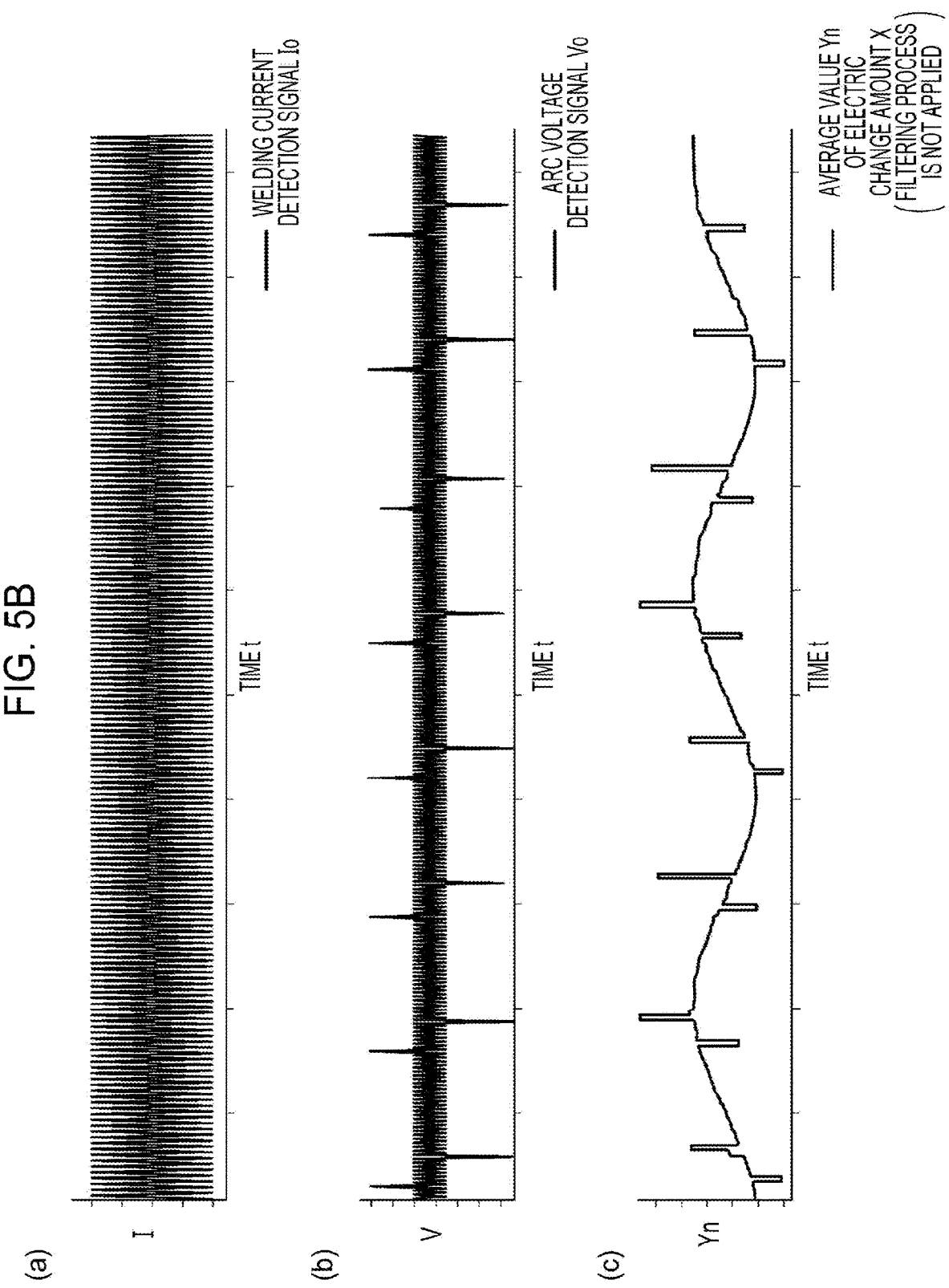
FIG. 5B is a graph showing a welding current waveform and an arc voltage waveform when an abnormal voltage is generated, and information on protruding change extracted from the welding current waveform and the arc voltage waveform by a control method according to the present invention.

FIGS. 5A to 5C show an example when an abnormal signal occurs in the arc voltage detection signal Vo. More specifically, FIG. 5A shows the welding current detection signal Io ((a) in FIG. 5A) and the arc voltage detection signal Vo ((b) in FIG. 5A), and the information on protruding change ((c) in FIG. 5A) obtained by a conventional control method in which the welding current detection signal Io is sampled with a predetermined sample cycle (for example, 5 μs). FIG. 5B shows the welding current detection signal Io ((a) in FIG. 5B) and the arc voltage detection signal Vo ((b) in FIG. 5B), and the information on protruding change ((c) in FIG. 5B) extracted by the control method of the present embodiment, in which the welding current detection signal Io is sampled with a predetermined sample cycle (for example, 5 μs). FIG. 5C shows the welding current detection signal Io ((a) in FIG. 5C) and the arc voltage detection signal Vo ((b) in FIG. 5C), and the information on protruding change extracted by a control method of the present modification, in which the welding current detection signal Io is sampled with a predetermined sample cycle (for example, 5 μs).

As shown in FIG. 5A, signal blurring occurs in the signal (waveform information of the electric change amount X) representing the information on protruding change extracted by a conventional control method. Also, as shown in FIG. 5B, a pulse-like waveform is observed corresponding to an abnormality occurrence portion of the arc voltage detection signal Vo in the signal (waveform information of the average value Yn of the electric change amount X) representing the information on protruding change extracted by a conventional control method of the present embodiment. In contrast, as shown in FIG. 5C, when the average value Yn in the target measurement period exceeds the upper limit, control value or the lower limit control value, in the signal (waveform information of the average value Yn of the electric change amount, X) representing the information on protruding change extracted by a control method of the modification in which control of a predetermined process is performed, blurring of the signal and a pulse-like waveform are not observed, and it is seen that highly accurate information on protruding change is obtained.

<External Characteristics>

The pulse arc welding method includes a technique in which as an external characteristic, drooping characteristic is selected, which has an output characteristic such that even when the voltage changes, the current hardly changes, and the stability of the pulse cycle and the arc is achieved by setting the slope of the drooping characteristic to an optimal value. However, when the external characteristic is set as the drooping characteristic, due to its output characteristic, change in the welding current according to variation in the protruding length is smaller than that in the case of constant voltage characteristic (characteristic such that even when the current changes, the voltage hardly changes). Therefore, with a conventional method which performs arc profile control by the action of the welding current, highly accurate arc profile control is not achieved although welding workability is advantageous.

In the profile control method according to the present embodiment, regardless of the output characteristic of the external characteristic, highly accurate arc profile control can be achieved even when any one of the constant voltage characteristic, the constant current characteristic, and the drooping characteristic is used for the output characteristic, for example. Note that in order to achieve the stability of the pulse cycle and the arc mentioned above, it is preferable to use a characteristic similar to the drooping characteristic. Specifically, it is more preferable to set the slope of the external characteristic in the range of −1V/100 A to −15V/100 A, and it is further preferable to set the slope of the external characteristic in the range of −3V/100 A to −12V/100 A. In the present embodiment, even when the external characteristic with the above slope is set, highly accurate arc profile can be obtained as in the case of the constant voltage characteristic by using the average value of Io/Vo in the predetermined period Tf or the average value of Vo/Io in the predetermined period Tf as the average value Yn. In other words, when Io and Vo are used, the profile performance may be reduced due to the effect of the external characteristic.

Note that the present invention is not limited to the embodiment described above, and may be modified, or improved as needed. For example, in the present embodiment, as shown in FIG. 2, in the arc welding system 1, the profile device 170 is provided as a unit having a function of profile control, separately from the welding power supply 150 and the robot controller 160. However, even when the welding power supply 150 or the robot controller 160 is internally provided with a controller having such a function, the same effect can be obtained.

As described above, the present specification discloses the following matters.

(1) A pulse arc welding profile control method that, in pulse arc welding to perform welding by periodically changing a welding current and an arc voltage, causes a welding torch to perform weaving in a groove, and follows a welding line according to an electric change amount X detected at a time of the weaving,
wherein the electric change amount X includes, as a parameter, at least one of a welding current detection signal Io and an arc voltage detection signal Vo,
an average value Yn of the electric change amount X is calculated for every one interval, the one interval being a predetermined period Tf, and
information on protruding change in the groove is extracted and the welding line is followed based on the average value Yn.

With this configuration, even when a pulse arc welding method is used, information on protruding change is extractable with high accuracy without influence from the welding current and the arc voltage having a pulse shape.

(2) The pulse arc welding profile control method according to (1) described above, wherein the predetermined period Tf is one cycle of pulse or multiple cycles of pulse of the electric change amount X.

With this configuration, highly accurate information on protruding change can be obtained.

(3) The profile control method according to (1) or (2) described above, wherein the electric change amount X includes, as a parameter, a ratio (Vo/Io) of the arc voltage detection signal Vo to the welding current detection signal Io, or a ratio (Io/Vo) of the welding current detection signal Io to the arc voltage detection signal Vo.

With this configuration, highly accurate arc profile control can be achieved regardless of the output characteristic of the external characteristic, such as the constant voltage characteristic, the constant current characteristic, and the drooping characteristic.

(4) The profile control method according to (3) described above, wherein the average value Yn is a value obtained by multiplying an average value of the electric change amount X in the predetermined period Tf by a predetermined set voltage Vset when the electric change amount X is the ratio (Io/Vo) of the welding current, detection signal Io to the arc voltage detection signal Vo.

With this configuration, the unit of the average value Yn calculated by multiplying the average value of Io/Vo in the predetermined period Tf by the set voltage Vset is the same as the unit of Io, thus compatibility can be established with a conventional robot controller that performs control with only the welding current detection signal Io.

(5) The profile control method according to any one of (1) to (4) described above, wherein the average value Yn is calculated using the electric change amount X which is filtered with a frequency filter.

With this configuration, highly accurate information on protruding change can be obtained.

(6) The profile control method according to (5) described above, wherein the frequency filter is a low pass filter having a cutoff frequency selected from a range of 10 to 120 Hz.

With this configuration, highly accurate information on protruding change can be obtained.

(7) The profile control method according to any one of (1) to (6) described above, wherein an upper limit limiting value is calculated by adding a predetermined upper limit range value to a central value, and a lower limit limiting value is calculated by adding a predetermined lower limit range value to the central value which is the average value Yn of the electric change amount X in an immediately preceding interval of a target measurement period, and
when the average value Yn in the target measurement period exceeds the upper limit limiting value or falls below the lower limit limiting value, a predetermined process is performed.

With this configuration, even when an abnormal voltage occurs in the arc voltage, highly accurate information on protruding change can be obtained.

(8) A control device that, in pulse arc welding to perform welding by periodically changing a welding current and an arc voltage, causes a welding torch to perform weaving in a groove, and follows a welding line according to an electric change amount X detected at a time of the weaving,
wherein the electric change amount X includes, as a parameter, at least one of a welding current detection signal Io and an arc voltage detection signal Vo, and
an average value Yn of the electric change amount X is calculated for every one interval, the one interval being a predetermined period Tf.

With this configuration, information on protruding change is extractable with high accuracy without influence from the welding current and the arc voltage having a pulse shape.

(9) The control device according to (8) described above, wherein control is performed so that the information on protruding change in the groove is extracted and the welding line is followed based on the average value Yn.

With this configuration, information on protruding change is extractable with high accuracy without influence from the welding current and the arc voltage having a pulse shape.

(10) A welding system comprising a control function that, in pulse arc welding to perform welding by periodically changing a welding current and an arc voltage, causes a welding torch to perform weaving in a groove, and follows a welding line according to an electric change amount X detected at a time of the weaving,
   wherein in the control function, the electric change amount X includes, as a parameter, at least one of a welding current detection signal Io and an arc voltage detection signal Vo,
   an average value Yn of the electric change amount X is calculated for every one interval, the one interval being a predetermined period Tf, and
   the information on protruding change in the groove is extracted and the welding line is followed based on the average value Yn.

With this configuration, information on protruding change is extractable with high accuracy without influence from the welding current and the arc voltage having a pulse shape.

(11) A welding program that, in pulse arc welding to perform welding by periodically changing a welding current and an arc voltage, causes a welding torch to perform weaving in a groove, and follows a welding line to perform welding according to an electric change amount X detected at a time of the weaving, the welding program comprising:
   a step of weaving a welding torch in a groove;
   a step of detecting the electric change amount X at a time of the weaving;
   a step of calculating an average value Yn of the electric change amount X for every one interval, the one interval being a predetermined period Tf;
   a step of extracting information on protruding change in the groove based on the average value Yn; and
   a step of following the welding line based on the information on protruding change.

With this configuration, information on protruding change is extractable with high accuracy without influence from the welding current and the arc voltage having a pulse shape, thus the welding line can be followed precisely.

(12) A welding power supply including a function that, in pulse arc welding to perform welding by periodically changing a welding current and an arc voltage, causes a welding torch to perform weaving in a groove, and follows a welding line according to an electric change amount X detected at a time of the weaving, the welding power supply comprising:
   a power supply unit that generates an arc to supply electric power for welding;
   a current controller that receives a signal such as a feed speed command, a welding current command, an arc voltage command, and calculates a control amount of the power supply unit;
   a current detector that detects a welding current Iw during welding, and outputs a welding current detection signal Io;
   a voltage detector that detects an arc voltage Vw during welding, and outputs an arc voltage detection signal Vo; and
   a controller that performs control such that the electric change amount X includes, as a parameter, at least one of the welding current detection signal Io and the arc voltage detection signal Vo,
   an average value Yn of the electric change amount X is calculated for every one interval, the one interval being a predetermined period Tf, and
   information on protruding change in the groove is extracted and the welding line is followed based on the average value Yn.

With this configuration, information on protruding change is extractable with high accuracy without influence from the welding current and the arc voltage having a pulse shape.

Although various embodiments have been described with reference to the drawings so far, it is needless to say that the present invention is not limited to those examples. It is apparent that various modifications and alterations will occur to those skilled in the art within the scope of the appended claims, and it should be understood that those modifications and alterations naturally fall within the technical scope of the present invention. In a range without departing from the spirit of the present invention, the components in the above embodiments may be combined in any manner.

Note that this application is based on Japanese Patent Application (No. 2019-008490) filed on Jan. 22, 2019, the entire contents of which are incorporated herein by reference.

REFERENCE SIGNS LIST

1 ARC WELDING SYSTEM
11 WELDING UNIT
20 TRAJECTORY PLANNER
21 TEACHING DATA STORAGE
22 TEACHING DATA ANALYZER
23 CORRECTION AMOUNT CALCULATION UNIT
24 RIGHT AND LEFT DISPLACEMENT DETECTOR
25 ARC VOLTAGE COMMAND
26 FEED SPEED COMMAND
30 POWER SUPPLY UNIT
31 CURRENT DETECTOR
32 VOLTAGE DETECTOR
33 CURRENT CONTROLLER
34 PULSE STATE GENERATOR
35 PULSE CYCLE COUNTER
36 CURRENT SETTING UNIT
40 ELECTRIC CHANGE AMOUNT CALCULATION UNIT (CONTROL DEVICE)
50 ROBOT DRIVE UNIT
100 WELDING WIRE (CONSUMABLE ELECTRODE)
110 WELDING TORCH
120 WELDING ROBOT
130 FEEDING DEVICE
140 SHIELD GAS SUPPLY DEVICE
150 WELDING POWER SUPPLY
160 ROBOT CONTROLLER (CONTROL DEVICE)
170 PROFILE DEVICE (CONTROL DEVICE)
200 BASE MATERIAL (OBJECT TO BE WELDED, WORK)
Iw WELDING CURRENT
Io WELDING CURRENT DETECTION SIGNAL
Ir CURRENT SETTING CONTROL SIGNAL
Iset SET CURRENT
LL LOWER LIMIT RANGE VALUE
Tf PREDETERMINED PERIOD (ONE INTERVAL OF PULSE)
UL UPPER LIMIT RANGE VALUE
Vset SET VOLTAGE
Vw ARC VOLTAGE
Vo ARC VOLTAGE DETECTION SIGNAL
Vr ARC VOLTAGE COMMAND SIGNAL
Fr FEED SPEED COMMAND SIGNAL
Pent COUNT VALUE
X ELECTRIC CHANGE AMOUNT
Yn AVERAGE VALUE OF ELECTRIC CHANGE AMOUNT X
Yn(n−1) AVERAGE VALUE OF ELECTRIC CHANGE AMOUNT X IN IMMEDIATELY PRECEDING INTERVAL Yn(n−1)+UL UPPER LIMIT LIMITING VALUE
Yn(n−1)−LL LOWER LIMIT LIMITING VALUE

The invention claimed is:

1. A pulse arc welding profile control method in pulse arc welding to perform welding by periodically changing a welding current and an arc voltage, the method comprising:
    weaving a welding torch in a groove;
    detecting an electric change amount at a time of the weaving;
    calculating an average value of the electric change amount for every one interval, the one interval being a predetermined period;
    extracting information on protruding change in the groove based on the average value; and
    following the welding line based on the information on protruding change, wherein
    the electric change amount includes, as a parameter, at least one of a welding current detection signal and an arc voltage detection signal,
    an upper limit limiting value is calculated by adding a predetermined upper limit range value to a central value, and a lower limit limiting value is calculated by adding a predetermined lower limit range value to the central value which is the average value of the electric change amount in an immediately preceding interval of a target measurement period, and
    when the average value in the target measurement period exceeds the upper limit limiting value or falls below the lower limit limiting value a predetermined process is performed.

2. The pulse arc welding profile control method according to claim 1, wherein the predetermined period is one cycle of pulse or multiple cycles of pulse of the electric change amount.

3. The pulse arc welding profile control method according to claim 1, wherein the electric change amount includes, as a parameter, a ratio of the arc voltage detection signal to the welding current detection signal, or a ratio of the welding current detection signal to the arc voltage detection signal.

4. The pulse arc welding profile control method according to claim 3, wherein the average value is a value obtained by multiplying an average value of the electric change amount in the predetermined period by a predetermined set voltage when the electric change amount is the ratio of the welding current detection signal to the arc voltage detection signal.

5. The pulse arc welding profile control method according to claim 1, wherein the average value is calculated using the electric change amount which is filtered with a frequency filter.

6. The pulse arc welding profile control method according to claim 5, wherein the frequency filter is a low pass filter having a cutoff frequency selected from a range of 10 to 120 Hz.

7. A control device for pulse arc welding including periodically changing a welding current and an arc voltage, comprising a controller configured to:
    cause a welding torch to perform weaving in a groove;
    cause the torch to follow a welding line according to an electric change amount detected at a time of the weaving; and
    calculates an average value of the electric change amount for every one interval, the one interval being a predetermined period, wherein
    the electric change amount includes, as a parameter, at least one of a welding current detection signal and an arc voltage detection signal,
    an upper limit limiting value is calculated by adding a predetermined upper limit range value to a central value, and a lower limit limiting value is calculated by adding a predetermined lower limit range value to the central value which is the average value of the electric change amount in an immediately preceding interval of a target measurement period, and
    when the average value in the target measurement period exceeds the upper limit limiting value or falls below the lower limit limiting value, a predetermined process is performed.

8. The control device according to claim 7, wherein
    the controller extracts information on protruding change in the groove, and
    the welding line is followed based on the average value.

9. A non-transitory computer readable medium storing instructions for executing a method for controlling welding performed by a computer processor, the method comprising:
    weaving a welding torch in a groove;
    detecting an electric change amount at a time of the weaving;
    calculating an average value of the electric change amount for every one interval, the one interval being a predetermined period;
    extracting information on protruding change in the groove based on the average value; and
    following the welding line based on the information on protruding change, wherein an upper limit limiting value is calculated by adding a predetermined upper limit range value to a central value, and a lower limit limiting value is calculated by adding a predetermined lower limit range value to the central value which is the average value of the electric change amount in an immediately preceding interval of a target measurement period, and
    when the average value in the target measurement period exceeds the upper limit limiting value or falls below the lower limit limiting value, a predetermined process is performed.

10. A welding system for pulse arc welding including periodically changing a welding current and an arc voltage, causing a welding torch to perform weaving in a groove to follow a welding line according to an electric change amount detected at a time of the weaving, comprising:
    a power supply comprising:
        a power supply unit that generates an are to supply electric power for welding;
        a current controller that receives a signal comprising at least one of a feed speed command, a welding current command, and an arc voltage command, and determines a control amount of the power supply unit;
        a current detector that detects a welding current during welding, and outputs a welding current detection signal; and
        a voltage detector that detects an arc voltage during welding, and outputs an arc voltage detection signal; and
    a controller that
    performs control such that the electric change amount includes, as a parameter, at least one of the welding current detection signal and the arc voltage detection signal,
    calculates an average value of the electric change amount for every one interval, the one interval being a predetermined period, and extracts information on protruding change in the groove, wherein the welding line is followed based on the average value, an upper limit limiting value is calculated by adding a predetermined upper limit range value to a central value, and a lower limit limiting value is calculated by adding a predetermined lower limit range value to the central value which is the average value of the electric change amount in an immediately preceding interval of a target measurement period, and when the average value in the target measurement period exceeds the upper limit limiting value or falls below the lower limit limiting value, a predetermined process is performed.

* * * * *